United States Patent
Disselhorst et al.

(10) Patent No.: US 10,041,670 B2
(45) Date of Patent: Aug. 7, 2018

(54) BURNER, REACTOR AND PROCESS FOR GASIFICATION OF A HYDROCARBON FEED

(71) Applicant: Air Products and Chemicals, Inc., Allentown, PA (US)

(72) Inventors: Johannes Hermanus Maria Disselhorst, Castricum (NL); Johannes Cornelis De Jong, Alphen aan den Rijn (NL); Chengming Gao, Amsterdam (NL); Robert Schouwenaar, Amsterdam (NL)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 14/906,755

(22) PCT Filed: Jul. 22, 2014

(86) PCT No.: PCT/EP2014/065663
§ 371 (c)(1),
(2) Date: Jan. 21, 2016

(87) PCT Pub. No.: WO2015/011114
PCT Pub. Date: Jan. 29, 2015

(65) Prior Publication Data
US 2016/0178195 A1   Jun. 23, 2016

(30) Foreign Application Priority Data
Jul. 23, 2013   (EP) ..................................... 13177514

(51) Int. Cl.
*F23D 14/22* (2006.01)
*F23D 1/00* (2006.01)
(Continued)

(52) U.S. Cl.
CPC .............. *F23D 14/22* (2013.01); *C01B 3/363* (2013.01); *C10J 3/466* (2013.01); *C10J 3/485* (2013.01);
(Continued)

(58) Field of Classification Search
CPC ................. C10J 3/466; C10J 2200/152; C10J 2300/1223; C10J 2300/0976; C10J 3/485;
(Continued)

(56) References Cited

U.S. PATENT DOCUMENTS 8,545,726 B2 * 10/2013 Disselhorst .............. C10J 3/506
252/373
2013/0040255 A1   2/2013 Shi et al.

FOREIGN PATENT DOCUMENTS

CH     303030        11/1954
EP     2476956       7/2012
(Continued)

*Primary Examiner* — Amber R Orlando
*Assistant Examiner* — Syed T Iqbal
(74) *Attorney, Agent, or Firm* — Bryan C. Hoke, Jr.

(57) ABSTRACT

Process, reactor and burner for the gasification of a hydrocarbon fuel. The burner comprises coaxial channels for the separate supply of an oxidizer gas, a hydrocarbon fuel and a moderator gas. A coaxial channel with the smallest width is bordered by a separating wall with at least one gas exchange. The gas exchange passage can for example be formed by a retracted end of the separating wall and/or by openings in the separating wall.

13 Claims, 3 Drawing Sheets

Figure 1:
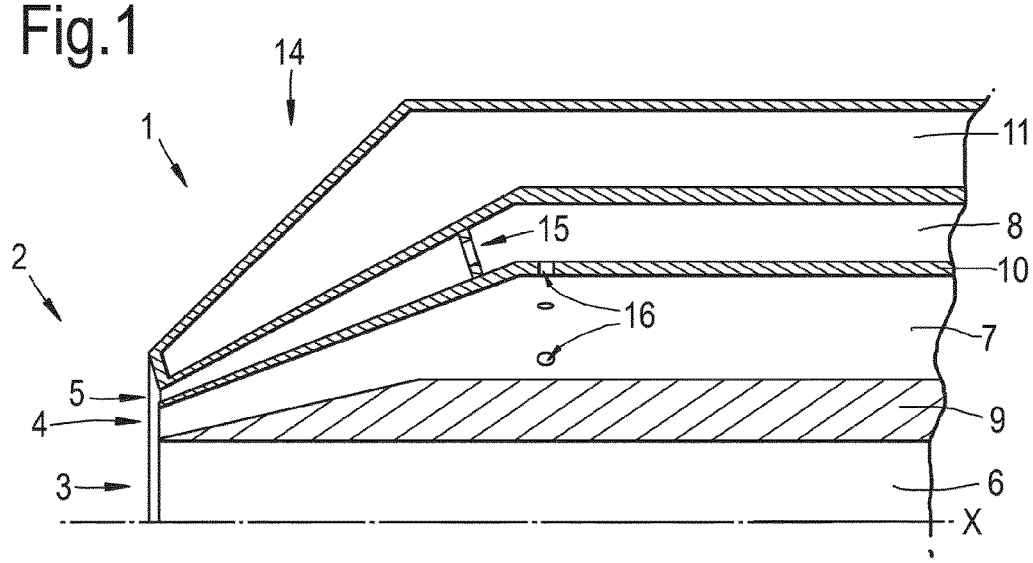

(51) Int. Cl.
*C01B 3/36* (2006.01)
*C01B 3/48* (2006.01)
*C01B 3/46* (2006.01)
*F23D 14/82* (2006.01)
*C10J 3/72* (2006.01)
*F23D 17/00* (2006.01)
*C10J 3/46* (2006.01)
*C10J 3/48* (2006.01)

(52) U.S. Cl.
CPC ............... *C10J 3/72* (2013.01); *F23D 1/005* (2013.01); *F23D 14/82* (2013.01); *F23D 17/00* (2013.01); *C01B 2203/0255* (2013.01); *C01B 2203/1235* (2013.01); *C10J 2200/152* (2013.01); *C10J 2300/0969* (2013.01); *C10J 2300/0976* (2013.01); *C10J 2300/1223* (2013.01); *F23D 2900/00016* (2013.01)

(58) Field of Classification Search
CPC ..... C10J 2300/0969; C10J 3/72; C01B 3/363; C01B 2203/0255; C01B 2203/1235; C01B 2203/04; C01B 2203/065; C01B 3/24; C01B 3/56; C01B 2203/06; C01B 2203/062; C01B 3/52; C01B 3/50; C01B 2203/1247; C01B 2203/84; C01B 2203/0485; C01B 2203/0415; C01B 2203/048; C01B 2203/0283; C01B 2203/0877; C01B 2203/025; C01B 2203/061; C01B 2203/148; C01B 2203/0475; C01B 2203/043; C01B 2203/86; C01B 3/48; C01B 2203/146; C01B 2203/0465; F23D 17/00; F23D 14/82; F23D 14/22; F23D 1/005; F23D 2900/00016; F23D 14/32; F23D 14/78; Y02E 20/344; Y02P 30/30

See application file for complete search history.

(56) References Cited

FOREIGN PATENT DOCUMENTS

| | | | |
|---|---|---|---|
| EP | 2584261 | 4/2013 | |
| WO | 2008006869 | 1/2008 | |
| WO | 2011085744 | 7/2011 | |
| WO | WO 2011085744 A1 * | 7/2011 | ............ C01B 3/363 |

* cited by examiner

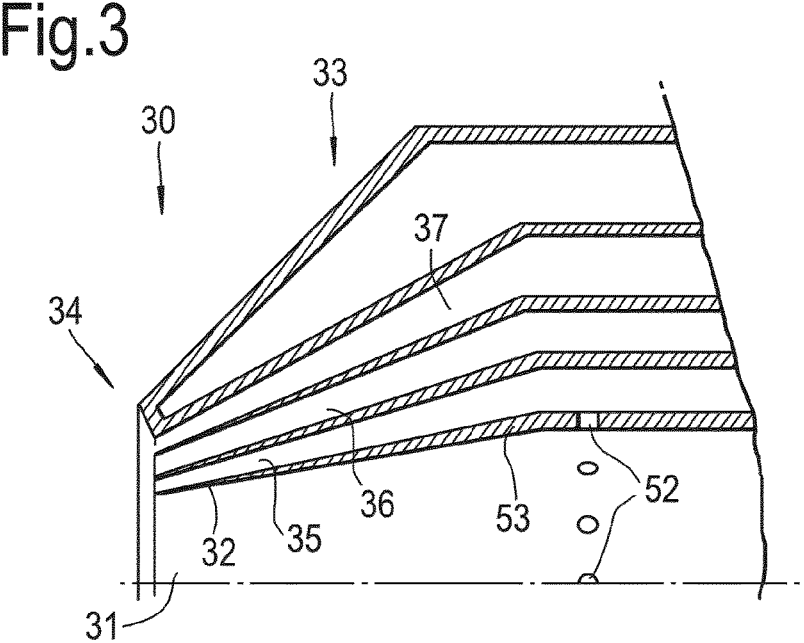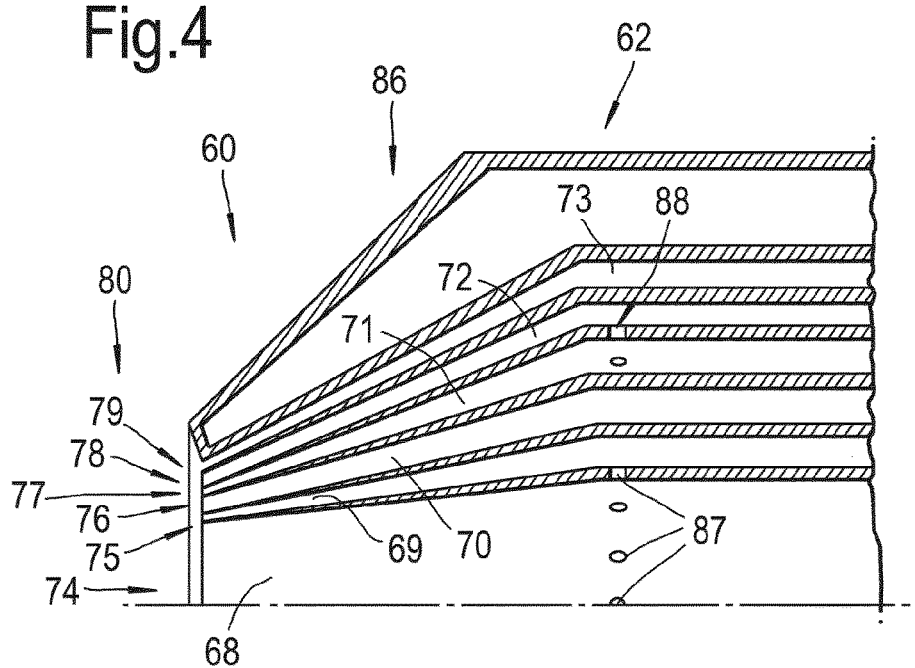

BURNER, REACTOR AND PROCESS FOR GASIFICATION OF A HYDROCARBON FEED

The present invention relates to a burner with a plurality of coaxial burner channels. The invention also relates to a gasification reactor and a process for the production of synthesis gas by partial combustion of a hydrocarbon feed using such a burner.

Synthesis gas is a gas comprising carbon monoxide and hydrogen gas and is typically used as a fuel gas or as a feedstock for the synthesis of methanol, ammonia, various other chemicals, or gaseous or liquid hydrocarbons.

WO 2008/006869 discloses a process for the manufacture of syngas using a multi-outlet burner with separate passages for a hydrocarbon fuel and for an oxidizer gas separated by a passage for a moderator gas, typically steam. At the burner front the steam flow lifts the flames and reduces the risk of damage by thermal stresses. To minimize use of moderator gas the moderator passage should be kept very narrow. This causes large temperature gradients resulting in very high thermal stresses in the separating passage walls. Moreover, after a shutdown of one of the channels, the remaining flows may cause a backflow into the shut passage.

It is an object of the invention to reduce thermal stresses in the burner. It is a further object of the invention to reduce the risk of backflow after a shutdown of one of the flows.

The object of the invention is achieved with a burner for the gasification of a hydrocarbon fuel comprising coaxial channels for the separate supply of an oxidizer gas, a hydrocarbon fuel and a moderator gas, wherein a coaxial channel with the smallest width is bordered by a separating wall with at least one gas exchange passage.

The channel with the smallest width is typically used for the supply of the moderator gas, while the channel at the other side of the separating wall with the at least one gas exchange passage is typically used for supplying the oxidizer gas. The burner may comprise a retracted end of the separating wall. It has been found that this effectively reduces thermal stresses while the flame lifting potential of the moderator gas flow is unaffected. The retraction can for example be between 1 to 6 times the width of the narrower channel adjacent the retracted wall end, for instance between 2 to 4 times this width.

The gas exchange passage is formed by at least one opening in the separating wall. If the flow in one of the channels stops, the pressure in that channel drops and part of the flow in the other channel enters the channel via the gas exchange opening. This way, a positive flow in the direction of the burner front is maintained. A backflow of hot gas from the gasification zone into the shutdown channel can effectively be prevented. The total area of the one or more openings in the separating wall can for example be between 0.3 and 3 times the outlet area of the narrowest channel, e.g., between 0.6 and 1.5 times this area.

Optionally, one or more of the channels is defined by channel walls with end sections converging towards the burner front. This creates backpressure in the respective channels in case of forward flow. In such a configuration, the one or more gas exchange passages may include openings positioned upstream of the converging section. Alternatively or additionally, backpressure can be created by one or more restrictions in the channel, positioned downstream of the one or more gas exchange passages.

During operation there is little gas exchange via the gas exchange openings, because the back pressure of the oxidizer supply is close to the backpressure of the moderator gas flow. However, after a shut-down of the oxidizer supply, the backpressure of the oxidizer content drops, and moderator gas will flow into the oxidizer channel. This prevents a back flow in the oxidizer channel and maintains a positive flow towards the burner front in the respective channels under all operating conditions.

In operation the coaxial channels of the burner are connected to inlet passages for the separate supply of one or more hydrocarbon fuels, an oxidizer gas and a moderator gas. One or more channels connected to an inlet for a moderator gas can be arranged adjacent to a channel connected to an inlet for an oxidizer gas, the wall separating these channels being provided with the gas exchange passage(s). The burner can for example have at least 3 coaxial channels, e.g., 3-7 coaxial channels, or more than 7 coaxial channels, if so desired.

The width of the outlet of the moderator channel(s) is relatively small compared to the width of the oxidizer gas channel(s) and the fuel channel(s). For instance, at the burner front the outlet area of the moderator gas outlet can be about 0.1-0.3 times the outlet area of the oxidizer outlet.

According to an embodiment the channel with the smallest width is connected to an inlet passage for the supply of moderator gas. The channel at the other side of the separating wall with the at least one gas exchange passage is connected to an inlet passage for the supply of oxidizer gas.

The inlet passage for the supply of moderator gas is connected to a source of a moderator gas. The inlet passage for the supply of oxygen gas is connected to a source of an oxidizer gas.

The burners may for instance comprise hollow wall members with internal cooling fluid (e.g. water) passages.

Optionally, the burner may be provided with a suitable ceramic or refractory lining applied onto or suspended closely to the outer surface of the burner for resisting the heat load during operation or during heat-up or shut down of the reactor.

Oxidiser gas is a gas comprising oxygen, such as air or concentrated oxygen, such as pure oxygen having a purity of between 95 and 100 vol. %. The oxidiser gas can also comprise a mixture of oxygen and moderator gas, e.g., with a moderator gas content between 5 and 30 wt % by weight of the total mixture. The presence of some moderator gas in the oxidizer allows a process operator to control the flow velocity of the moderator gas in the moderator gas channel and the total flow of the moderator gas, so as to obtain an optimum amount of moderator gas for the process.

The moderator gas can for example be or comprise steam and/or or carbon dioxide.

The hydrocarbon feed can for example be a gas or a liquid, such as an emulsion or a slurry, which is pumpable at gasifier feed pressure and temperature and comprises a carbonaceous component, such as slurries of solid carbonaceous fuels dispersed in liquid hydrocarbons. The carbonaceous component may for example comprise butanes, pentanes, hexanes, natural gasolines, kerosenes, gas oils, naphthas, diesel fuels, crude oils, residual (whether atmospheric or vacuum), pitch, biomass, as well as hydrocarbons which may contain other atoms such as oxygen, e.g., in such proportions as not to interfere with self-sustaining combustion.

Suitable hydrocarbon feeds include for example heavy crude oil residues, e.g., having a kinematic viscosity between 1 and 3000 cSt, preferably between 1 and 1000 cSt as measured at the temperature of the hydrocarbon feed as it is supplied to the burner.

Alternatively, or additionally, the hydrocarbon feed may comprise a dense phase of finely divided particles of solid carbonaceous fuel, such as pulverized coal, e.g., in a suspension gas comprising nitrogen, carbon dioxide and/or a gaseous fuel.

The exit flow velocity of the hydrocarbon feed at the outlet at the burner front can for example be between 2 and 20 m/s, e.g., between 2 and 20 m/s for a liquid hydrocarbon. For a gaseous hydrocarbon feed the flow velocity can for example be between 5 and 100 m/s, e.g., between 15 and 40 m/s.

The exit flow velocity of the moderator gas can for example be at least 5 times the exit flow velocity of the liquid hydrocarbon feed if the moderator gas channel is adjacent to the liquid feed channel, for instance between 40 and 200 m/s, e.g., between 40 and 150 m/s, e.g., between 60 and 120 m/s. In this way the moderator gas aids in the atomisation of the liquid. If the moderator gas channel is not adjacent to a liquid feed channel its exit flow velocity can for example be between 10 and 60 m/s., e.g., between 20 and 40 m/s.

The exit flow velocity of the oxidiser gas can for example be between 30 and 150 m/s, e.g., between 60 and 120 m/s, e.g., between 70 and 100 m/s.

Optionally, one or more of the channels may comprise a swirl velocity component. This will improve mixing of the reactants. The angle between the flow direction and the azimuthal direction may for example be between 0 and 60 degrees, e.g., between 30 and 45 degrees.

The process can be performed in a reactor provided with at least one burner as disclosed above. The burner can for example be arranged at the top end of such a reactor. The reactor may for instance comprise a vertically oriented cylindrical vessel having an outlet for the mixture of carbon monoxide and hydrogen, e.g., at its lower end. Such gasification reactors are for example described in Chapter 5.4 of Gasification, by Chris Higman and Maarten van der Burgt, Elsevier Science (USA), 2003 pages 128-147.

The process is typically performed at a temperature of between 1000 and 1800° C. measured at the syngas outlet of the reactor. The pressure of the produced syngas is, e.g., between 0.3 and 12 MPa, e.g., between 3 and 8 MPa. The process can for example be performed near or at a crude oil refinery because the produced synthesis gas can directly be applied as a feedstock for the production of hydrogen or as a fuel gas, for example, for heating the furnaces of the refinery or more efficiently for the firing of gas turbines to produce electricity and heat. Hydrogen as prepared by the above process may be advantageously used in a hydroprocessing process, such as hydrogenation, hydrocracking, isomerisation-dewaxing or catalytic dewaxing type processes.

The mixture of carbon monoxide and hydrogen as prepared, sometimes also referred to as synthesis gas, may also be advantageously used as a feedstock for the synthesis of methanol, ammonia or hydrocarbons via the Fischer-Tropsch process, which latter synthesis yields gaseous hydrocarbons and liquid hydrocarbons such as gasoline, middle distillates, lube oils and waxes.

The invention will be further explained by reference to the accompanying drawings.

Figure 2:
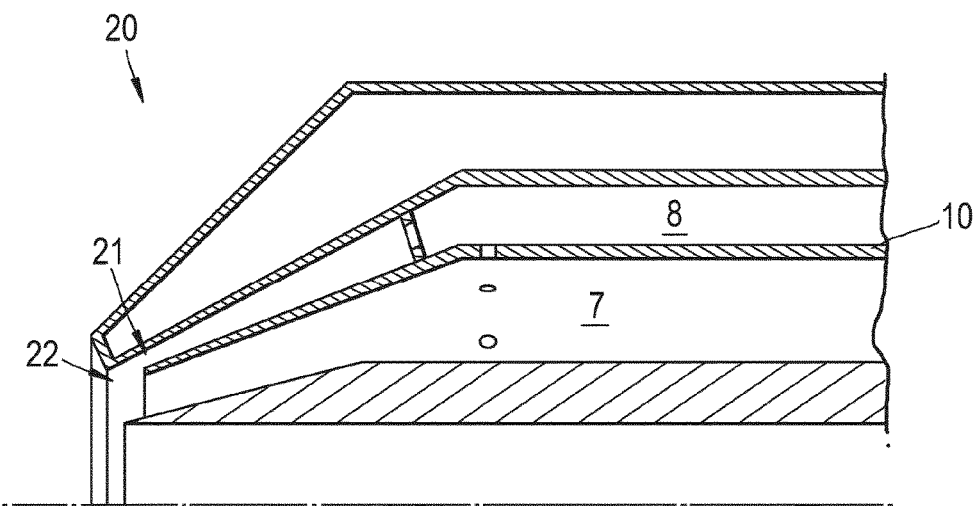
Figure 5:
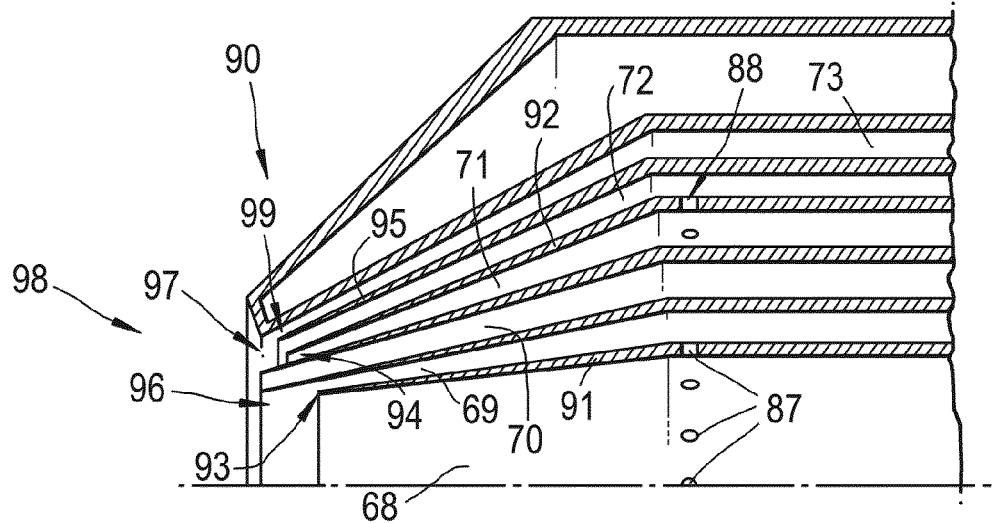

FIG. 1: shows schematically in cross section a first exemplary embodiment of a burner;

FIG. 2: shows schematically in cross section a second exemplary embodiment of a burner;

FIG. 3: shows schematically in cross section a third exemplary embodiment of a burner;

FIG. 4: shows schematically in cross section a fourth exemplary embodiment of a burner;

FIG. 5: shows schematically in cross section a fifth exemplary embodiment of a burner.

FIG. 1 shows a burner 1 in a cross section along its longitudinal axis X. Only the upper half is shown, the lower half being a mirror image of the upper half. The burner 1 has a burner front 2 with three concentric outlets 3, 4, 5 and three coaxial channels 6, 7, 8 leading to the respective outlets 3, 4, 5 at the burner front 2: a central first channel 6 surrounded by a annular second channel 7, which is in turn surrounded by an annular outer channel 8. The central channel 6 is bordered by a cylindrical first separating wall 9. The annular second channel 7 is bordered by the first separating wall 9 and a second cylindrical separating wall 10 around the first wall 9. The annular outer channel 8 is bordered by the second separating wall 10 and a cooled third cylindrical wall 11 around the second wall 10. The third wall comprises a hollow barrel with channels for a cooling fluid (not shown). The burner 1 comprises a converging section 14, where the first, second and third walls 9, 10, 11 are configured to converge the annular second and third channels 7, 8 towards the burner front 2. The cylindrical first channel 6 does not have a converging section. To equalize flow distribution in the outer channel 8, the converging section of the outer channel is provided with one or more restrictions 15. Upstream of the converging section 14, the separating wall 10 between the second and third channel 7, 8 is provided with gas exchange openings 16.

The central channel 6 is connected to a source of a hydrocarbon fuel, e.g., a dense phase mixture of finely divided coal particles and nitrogen gas. The annular second channel 7 is connected to a source of an oxidizer gas. The outer annular third channel 8 is connected to a source of a moderator gas, such as steam. The flow velocity of the hydrocarbon feed in the central channel 6 is, e.g., between 2 and 20 m/s. The flow velocity of the moderator gas in the outer channel 8 is for example between 10 and 30 m/s. In the annular second channel 7 the flow velocity of the oxidiser gas is, e.g., between 40 and 100 m/s. The reactants enter a gasification zone in front of the burner front 2. In the gasification zone the hydrocarbon fuel is partially combusted by the oxidizer. The moderator gas lifts the flame from the burner front 2 to reduce damage of the burner front 2 by thermal stress.

In case of a shutdown of the supply of oxidizer gas, the oxidizer gas flow in the second channel 7 would stop and the pressure in the second channel 7 would drop. Moderator gas would flow from the outer channel 8 into the annular second channel 7 via the gas exchange openings 16 to maintain a positive flow of moderator gas in the second channel 7 and to prevent a back flow of hot gases in the second channel 7.

FIG. 2 shows an exemplary embodiment of a burner 20 similar to the burner of FIG. 1, with the difference that the second separating wall 10 is provided with a retracted end 21 defining another gas exchange passage 22 between the oxidizer flow channel 7 and the moderator gas flow channel 8. This way the thermal load by heat radiation from the hot reactor to the retracted tip 21 of the separating wall 10 is substantially reduced, resulting a reduced risk of deformation of the tip. If the pressure in one of the adjacent channels drops, the corresponding outlet will be filled with the other gas flow.

A third embodiment of a burner 30 is shown in FIG. 3. This burner 30 has a central oxidizer gas flow channel 31 connected to a source of an oxidizer gas. The central channel 31 is bordered by a first cylindrical separating wall 32. At a converging section 33 of the burner 30, the first separating wall 32 converges to narrow down the central channel towards the burner front 34. Coaxial second, third and fourth channels 35, 36, 37 converge to the same extent. The annular second and fourth 35, 37 channels supply a moderator gas to the respective outlets. The channel 36 between the moderator gas channels 35, 37 supplies a hydrocarbon fuel, such as a heavy crude oil residue.

A series of gas exchange openings 52 is provided in the separating wall 53 connecting the central oxidizer gas channel 31 and the inner moderator gas channel 35. The gas exchange openings 52 are positioned upstream of the converging section 33 of the burner 30. If the supply of oxidizer gas to the channel 31 is stopped the gas exchange openings 52 will assure that a purge is maintained in the outlet of the channel 31.

A fourth exemplary embodiment of a burner 60 is shown in FIG. 4. This burner 60 comprises six coaxial channels 68-73 with respective outlets 74-79 at the burner front 80: a central first channel 68, annular second, third, fourth and fifth channels 69, 70, 71, 72 and an outer annular sixth channel 73.

The central downstream channel 68 and the annular fifth channel 72 are connected to a supply of oxidiser gas. The annular third channel 70 is connected to a supply of hydrocarbon fuel. The annular second, fourth and sixth channels 69, 71, 73 are connected to a supply of moderator gas.

The burner 60 comprises a converging section 86 wherein particularly the moderator gas channels 69, 71 narrow down towards the burner front 80. Upstream of the converging section 86 gas exchange openings 87 connect the first channel 68 with the oxidizer flow to the second channel 69 with the moderator gas flow. Similarly, gas exchange openings 88 connect the fifth channel 72 with the oxidizer flow to the fourth channel 71 with the moderator gas flow.

A further embodiment of a burner 90 is shown in FIG. 5. This embodiment is similar to the burner 60 of FIG. 4, with the difference that the separating walls 91, 92 with the gas exchange openings 87, 88 have retracted ends 93, 94. Also the separating wall 95 between the fifth and the sixth channels 72, 73 has a retracted end 99, but less retracted than the other two retracted ends 93, 94. The retracted ends 93, 94 and 99 define gas exchange openings 96, 97 at the burner front between the oxidizer flow channels 68, 72 and respective moderator gas flow channels 69, 71, 73.

The invention claimed is:

1. Burner for the gasification of a hydrocarbon fuel, the burner comprising:
coaxial channels for the separate supply of an oxidizer gas, a hydrocarbon fuel and a moderator gas, wherein a coaxial channel with the smallest width is bordered by a separating wall with at least one gas exchange passage, the gas exchange passage being formed by at least one opening in the separating wall and the coaxial channel with the smallest width comprises one or more restrictions positioned downstream of the at least one gas exchange passage.

2. The burner of claim 1, comprising a retracted end of the separating wall.

3. The burner of claim 2, wherein the retracted end is retracted over a distance of 1 to 6 times the width of the narrowest channel.

4. The burner of claim 3, wherein the retracted end is retracted over a distance of 2 to 4 times the width of the narrowest channel.

5. The burner of claim 1, wherein the total area of the one or more openings in the separating wall is between 0.3 and 3 times the outlet area of the narrowest channel, e.g., between 0.6 and 1.5 times the outlet area of the narrowest channel.

6. The burner of claim 1, wherein the coaxial channels are connected to inlet passages for the separate supply of one or more hydrocarbon fuels, an oxidizer gas and a moderator gas.

7. The burner of claim 6 wherein a channel connected to an inlet for a moderator gas is adjacent to a channel connected to an inlet for an oxidizer gas, wherein the wall separating said channels is provided with the at least one gas exchange passage.

8. The burner of claim 7, wherein the channel with the smallest width is connected to an inlet passage for the supply of moderator gas.

9. The burner of claim 6, wherein the inlet passage for the supply of moderator gas is connected to a source of a moderator gas and the inlet passage for the supply of oxygen gas is connected to a source of an oxidizer gas.

10. The burner of claim 1, wherein the channels are defined by channel walls with end sections converging towards a burner front of the burner.

11. The burner of claim 10, wherein the one or more gas exchange passages include openings positioned upstream of the converging section.

12. The burner of claim 10, wherein upstream of the converging section gas exchange openings connect a first channel with an oxidizer flow to a second channel with a moderator gas flow; and wherein gas exchange openings connect a fifth channel with an oxidizer flow to a fourth channel with a moderator gas flow.

13. A reactor for the production of syngas by partial combustion of a hydrocarbon feed, the reactor comprising at least one burner according to claim 1, wherein at least one channel is connected to a supply of a non-gaseous hydrocarbon feed, at least one other channel is operatively connected to a supply of a gaseous hydrocarbon feed and at least one channel is operatively connected to a supply of a non-hydrocarbon moderator gas.

* * * * *